US012555979B1

United States Patent
Ray et al.

(10) Patent No.: US 12,555,979 B1
(45) Date of Patent: Feb. 17, 2026

(54) CURRENT-MODE AC-COUPLED OPTICAL DRIVER DEVICE

(71) Applicant: Marvell Asia Pte Ltd, Singapore (SG)

(72) Inventors: Sagar Ray, Fremont, CA (US); Chang-Feng Loi, Singapore (SG); The Linh Nguyen, San Jose, CA (US)

(73) Assignee: Marvell Asia Pte Ltd, Singapore (SG)

( * ) Notice: Subject to any disclaimer, the term of this patent is extended or adjusted under 35 U.S.C. 154(b) by 921 days.

(21) Appl. No.: 17/834,616

(22) Filed: Jun. 7, 2022

Related U.S. Application Data (60) Provisional application No. 63/197,987, filed on Jun. 7, 2021.

(51) Int. Cl.
| | |
|---|---|
| *H01S 3/10* | (2006.01) |
| *H01S 5/026* | (2006.01) |
| *H01S 5/065* | (2006.01) |
| *H01S 5/183* | (2006.01) |
| *H01S 5/02251* | (2021.01) |
| *H01S 5/40* | (2006.01) |

(52) U.S. Cl.
CPC .......... *H01S 5/0261* (2013.01); *H01S 5/0652* (2013.01); *H01S 5/183* (2013.01); *H01S 5/18302* (2013.01); *H01S 5/02251* (2021.01); *H01S 5/4012* (2013.01)

(58) Field of Classification Search
CPC ...... H01S 5/0261; H01S 5/0652; H01S 5/183; H01S 5/18302; H01S 5/02251; H01S 5/4012
See application file for complete search history.

(56) References Cited

U.S. PATENT DOCUMENTS

2002/0181533 A1* 12/2002 Vail ...................... H01S 5/4025
372/50.12
2005/0226279 A1* 10/2005 Xu ....................... H04B 10/564
372/9

(Continued)

OTHER PUBLICATIONS

Kozlov et al. "Capacitively-Coupled CMOS VCSEL Driver Circuits," IEEE Journal of Solid-State Circuits, vol. 51, No. 9 (Sep. 2016) 14 pages.

(Continued)

*Primary Examiner* — Kinam Park (57) ABSTRACT

An optical driver device for driving a light emitting device includes a high-frequency current driver including a first switching circuit configured to generate a first portion of modulation current for driving the light emitting device. The first portion of modulating current is provided to the light emitting device via a coupling capacitor. The high-frequency current driver is configured in current-mode driver topology that utilizes a first current source for generating the first portion of the modulation current. The optical driver device further includes a second switching circuit configured to generate a second portion of modulation current for driving the light emitting device. The second portion of modulation current is provided to the light emitting device via a path that bypasses the coupling capacitor. The low-frequency current driver configured in current-mode driver topology that utilizes a second current source for generating the second portion of modulation current.

20 Claims, 6 Drawing Sheets

(56) References Cited

U.S. PATENT DOCUMENTS

2007/0114361 A1* 5/2007 Kunst .................. H01S 5/0683
250/205
2010/0260220 A1* 10/2010 Yoffe ........................ H01S 5/12
372/50.11
2017/0222726 A1* 8/2017 Kubo .................. H01S 5/0427

OTHER PUBLICATIONS

Morita, et al. "ISSCC 2014/Session 8/Optical Links and Copper PHYs/8.2," 2014 IEEE International Solid-State Circuits Conference, Feb. 2014 (3 pages).
Ramani, et al. "A Differential Push-Pull Voltage Mode VCSEL Driver in 65-nm CMOS," IEEE Transactions on Circuits and Systems-I: Regular Papers, vol. 66, No. 11, Nov. 2019 (11 pages).
Schow et al., "Low-Power 16×10 Gb/s Bi-Directional Single Chip CMOS Optical Transceivers Operating at 5 mW/Gb/s/link," IEEE Journal of Solid-State Circuits, vol. 44, No. 1, Jan. 2009 (13 pages).
Yazaki et al., "25-Gbpsx4 optical transmittal with adjustable asymmetric pre-emphasis in 65-nm CMOS," pp. 2692-2695 (4 pages).

* cited by examiner

CURRENT-MODE AC-COUPLED OPTICAL DRIVER DEVICE

CROSS REFERENCES TO RELATED APPLICATIONS

This application claims the benefit of U.S. Provisional Patent App. No. 63/197,987, entitled "Current Mode AC-Coupled VCSEL Driver," filed on Jun. 7, 2021, the disclosure of which is hereby expressly incorporated herein by reference in its entirety.

FIELD OF TECHNOLOGY

The present disclosure relates generally to optical devices, and more particularly to a driver for an optical transmitter device.

BACKGROUND

Optical communication systems, such as communication systems using single-mode fiber or multi-mode fiber communication channels for data transmission, are becoming increasingly more popular due to high transmission speeds that such communication systems can achieve. Optical communication systems typically include a light-emitting device, such as a laser or a diode, for example, which is driven by an optical driver device based on data, generating current or voltage pulses that are then converted by the light emitting device to light energy for transmission over a fiber channel. One example of a light emitting device that is utilized with such optical communication systems is a vertical cavity surface emitting laser (VCSEL) device. VCSEL devices are often utilized, for example, for short-reach, low-cost parallel-optical communication link transmission due to relatively easy integration of VCSEL technology with multi-mode fiber systems.

In some implementations, optical drivers for VCSEL devices are fabricated in complimentary metal-oxide semiconductor (CMOS) technology. Fabricating optical drivers for VCSEL devices in CMOS technology allows the optical driver to be integrated with digital circuits that generate the data, for example, thereby reducing the overall cost of the system. A challenge in implementing optical drivers for VCSEL devices in CMOS technology is the voltage stress across high-speed core devices because a VCSEL device generally requires a relatively high bias voltage for data transmission. Also, due to the array structure of parallel optical communication links, reducing power dissipation for thermal compliance is desired. Some implementations use alternating current (AC) coupling to couple the optical driver to the VCSEL device, which permits the optical driver to be designed in a lower-voltage environment that is separated from the voltage required for biasing the VCSEL device. Such typical systems, however, often require large AC coupling capacitors that need to be provided externally to the optical driver device. Moreover, typical AC-coupled optical drivers cannot simultaneously provide suitably tight control of termination resistance of the optical driver device, gain linearity of the driver output frequency response, and pre-distortion in rise-fall time of the pulses output by the optical driver device that is desired for counter-acting rise-fall time imbalance that is inherent to a typical VCSEL device. These and other drawbacks of typical optical drivers result in degradation of quality of the optical signals generated by VCSEL devices and, ultimately, limit the speed of data transmission and/or increase in errors (e.g., bit error rates) experienced in data transmission, particularly for higher-order modulations, such as four-level pulse amplitude modulation (PAM4) often utilized for data transmission in the optical communication systems.

SUMMARY

In an embodiment, an optical driver device for driving a light emitting device comprises: a coupling capacitor for coupling an output of the driver to the light emitting device; a high-frequency current driver including a first switching circuit configured to generate a first portion of modulation current for driving the light emitting device, the first portion of modulating current provided to the light emitting device via the coupling capacitor, the high-frequency current driver configured in current-mode driver topology that utilizes a first current source for generating the first portion of the modulation current; and a low-frequency current driver including a second switching circuit configured to generate a second portion of modulation current for driving the light emitting device, the second portion of modulation current provided to the light emitting device via a path that bypasses the coupling capacitor, the low-frequency current driver configured in current-mode driver topology that utilizes a second current source for generating the second portion of modulation current.

In another embodiment, a method for driving a light emitting device using an optical driver device comprises: generating, using a first switching circuit of a high-frequency current driver included in the optical driver device, a first portion of modulation current for driving the light emitting device, the high-frequency current driver configured in current-mode topology that utilizes a first current source for generating the first portion of the modulation current; providing the first portion of the modulating current to the light emitting device via a coupling capacitor; generating, using a second switching circuit of a low-frequency current driver included in the optical driver device, a second portion of modulation current for driving the light emitting device, the low-frequency current driver configured in current mode driver topology that utilizes a second current source for generating the second portion of modulation current; and providing the second portion of the modulating current to the light emitting device via a path that bypasses the coupling capacitor.

DETAILED DESCRIPTION

As discussed above, AC-coupled drivers for light emitting devices, such as vertical cavity surface emitting laser (VCSEL) devices, are sometimes utilized to enable use of lower supply voltages for a portion of the driver and reduce power consumption of the driver. Typical AC-coupled drivers, however, either require large coupling capacitors to pass lower frequency components of the modulation current, generated by the driver, to the light emitting device or include separate current paths to pass high-frequency and low-frequency components of the modulating current, generated by the driver, to the light emitting device. Typical AC-coupled drivers that employ separate low-frequency and high-frequency current paths for providing modulating current to the light emitting device utilize voltage-mode driver circuits that make it difficult to control termination resistance of the optical driver device and/or increase a size of a terminating resistor that needs to be provided with the optical driver device. Moreover, typical AC-coupled drivers that utilize voltage-mode driver circuits introduce undesired non-linearities and non-smoothness in the frequency response of the resulting modulating current driving the light emitting device which, in turn, degrades performance of the light emitting device. Further, typical AC-coupled drivers do not provide pre-distortion of modulating current to counteract inherent rise-fall time imbalance inherent to some light emitting devices, such as vertical cavity surface emitting laser (VCSEL) devices.

In embodiments described below, an optical driver device for driving a light emitting device includes a coupling capacitor and a high-frequency current driver including a first switching circuit configured to generate a first portion of modulation current for driving the light emitting device. The first portion of modulating current is provided to the light emitting device via a coupling capacitor. The optical driver device further includes a second switching circuit configured to generate a second portion of modulation current for driving the light emitting device. The second portion of modulation current is provided to the light emitting device via a path that bypasses the coupling capacitor. In an embodiment, the high-frequency current driver is configured in current-mode driver topology for generating the first portion of the modulation current. Similarly, the low-frequency current driver configured in current-mode driver topology for generating the second portion of modulation current, in an embodiment.

Figure 1:
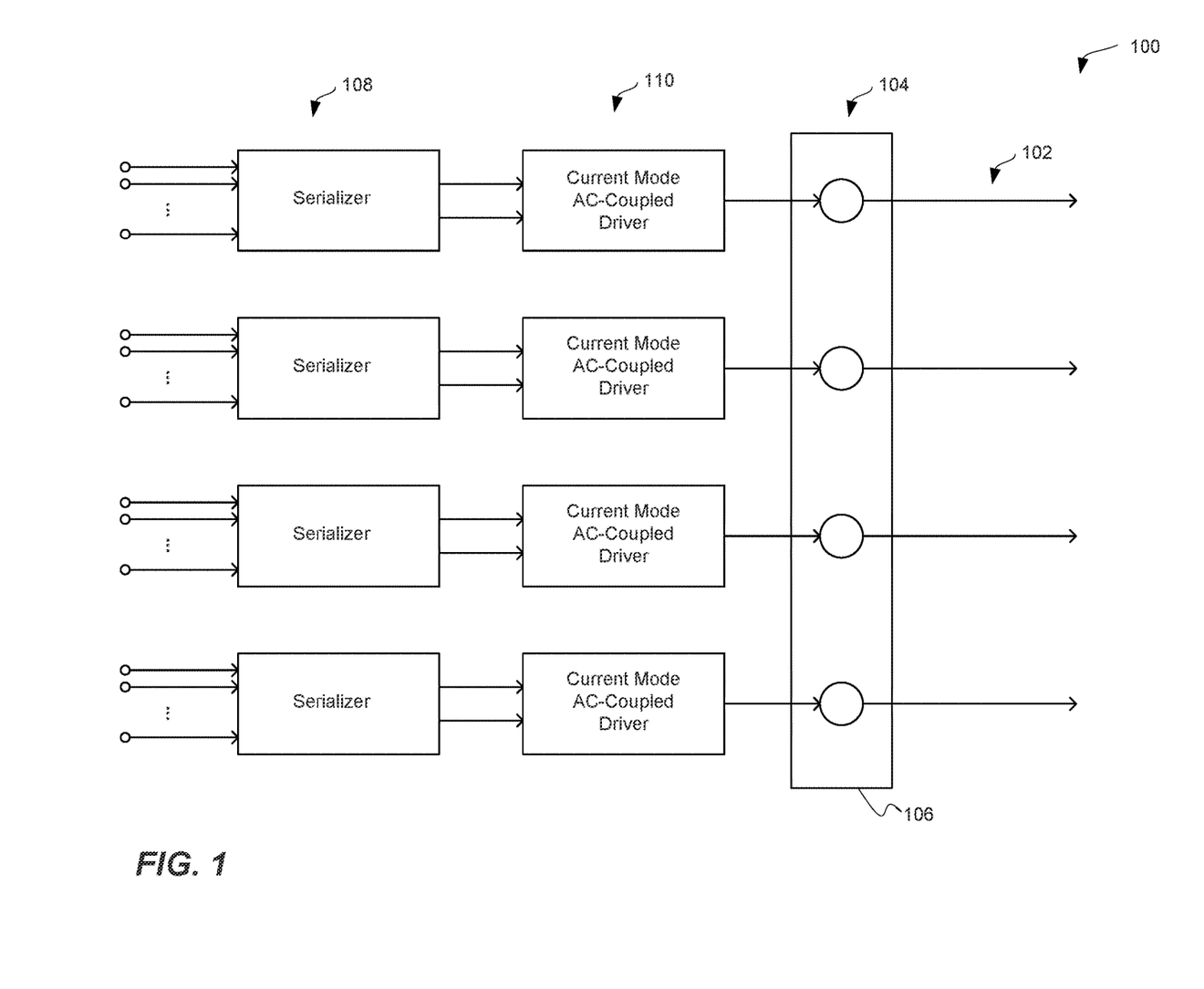
FIG. 1 is a block diagram of an example optical communication system in which a current-mode AC-coupled driver is utilized to drive an optical transmitter device, according to an embodiment.

Because the optical driver device is configured as fully a current-mode driver, termination resistance of the optical driver device is more easily and tightly controlled as compared to implementations that utilize voltage-mode drivers, in at least some embodiments. In some embodiments, the optical driver device utilizes current switching devices, such as current switching DACs, to provide the high-frequency and the low-frequency portions of the modulating current at the output of the optical driver device. As will be explained in more detail below, using DACs to provide the high-frequency and the low-frequency portions of the modulating current at the output of the optical driver device enables tight control of linearity and flat frequency response of the modulating current at the output of the optical driver device, and also allow the optical driver device to provide pre-distortion in rise-fall time of the modulating current to counteract rise-fall time imbalance inherent to some light emitting devices, such as VCSEL devices, by introducing, into the modulating current, a rise-fall time asymmetry in an opposite direction from the rise-fall time asymmetry of the light emitting devices. These and other configurations and techniques described herein reduce the size of terminating resistors and coupling capacitors that need to be provided with the optical transmitter device, reducing the cost of the optical driver device and enabling reduction of power dissipation in the optical driver device, without sacrificing performance of the light emitting device being driven by the optical driver device, in at least some embodiments FIG. 1 is a block diagram of an example optical communication system 100 in which current-mode AC-coupled drivers are utilized to drive a light emitting device of an optical transmitter, according to an embodiment. The optical communication system 100 is illustrated as having a plurality of parallel communication channels 102 coupled to respective light emitting devices 104 of a light-emitting device array 106. The communication channels 102 comprise multimode fiber communication channels suitable for transmission of high-speed data over relatively short distances, in an embodiment. In other embodiments, the communication channel 102 comprise suitable types of optical communication channels, such as single-mode fiber communication channels and/or the communication channels 102 are suitable for transmission of data at relatively lower speeds and/or over relatively longer distances. In an embodiment, the light emitting devices 104 comprise VCSEL devices (e.g., common-cathode (CC) VCSEL devices) or other suitable light emitting devices. Although the optical communication system 100 is illustrated as having four parallel communication channels 102 coupled to respective light emitting devices 104 of a light-emitting device array 106, the optical communication system 100 includes other suitable numbers of parallel communication channels 102 coupled to respective light emitting devices 104 of the light-emitting device array 106, in other embodiments. The optical communication system 100 also includes supporting electronics for each communication channel 102 including digital components, such as a data serializer 108, and an optical driver device 110. The data serializers 108 are configured to perform serialization of data to generate a steam of bits, or modulation symbols, for transmission via the communication channel 102. The optical driver devices 110 are configured to convert the stream of bits or modulation symbols into electrical current which is then converted to optical signals by the light emitting devices 104. The light signals are then propagated via the communication channels 102 to a receiving device (not shown in FIG. 2), in an embodiment.

In an embodiment, the optical driver devices 110 are fabricated using CMOS in complimentary metal-oxide semiconductor (CMOS) technology. Fabricating the optical driver devices 108 in CMOS technology allows the optical driver devices 108 to be integrated with digital circuits such as, for example, the serializers 108 on a same chip. Thus, for example, the optical driver devices 110 and the serializers 108 are fabricated on a same chip, reducing the cost of the optical transmitter and the overall cost of the optical communication system 100, in an embodiment. As will be explained in more detail below, in various embodiments, the optical driver devices 110 are configured as current-mode AC-coupled drivers that utilize separate high-frequency and low-frequency current drivers generating, respectively, a relatively high-frequency portion of modulating current that is passed through a coupling capacitor and a relatively-lower frequency portion of modulating current that is blocked by the coupling capacitor, to produce a combined modulating current at the output of the optical driver device. AC-coupling enables use of different voltage sources to power different portions of the optical driver devices 110, while using separate high-frequency and low-frequency current drivers to produce a combined current output for driving the light emitting devices 104 reduces the size of the coupling capacitors needed to couple the optical driver devices 110 to the light emitting devices 104, in various embodiments. Thus, a relatively lower source voltage is utilized to power at least a portion of digital components of the optical driver devices 110 as compared to a relatively higher voltage used for powering at least a portion of analog components of the optical driver devices 110 that provide sufficient power to properly power and bias the light emitting devices 104 of the light-emitting array 106, in embodiments. Further, because the optical driver devices 110 are configured as fully current-mode drivers, termination resistance of the optical driver devices 110 is more easily and tightly controlled as compared to implementations that utilize voltage-mode drivers, in at least some embodiments. In some embodiments, the optical driver devices 110 utilize current switching devices, such as current switching DACs, to provide the high-frequency and the low-frequency portions of the modulating current at the output of the optical driver device 110. As will be explained in more detail below, using DACs to provide the high-frequency and the low-frequency portions of the modulating current at the output of the optical driver device 110 enables tight control of linearity and flat frequency response of the modulating current at the output of the optical driver device 110, and also allow the optical driver device 110 to provide pre-distortion in rise-fall time of the modulating current to counteract rise-fall time imbalance inherent to the light emitting devices 104, by introducing, into the modulating current, a rise-fall time asymmetry in an opposite direction from the rise-fall time asymmetry of the light emitting devices 104, in at least some embodiments.

These and other configurations and techniques used in the optical driver devices 110 allow integration of the optical driver devices 110 on a same chip with digital components of the optical transmitter. Thus, for example, the data serializers 108 and the optical driver devices 110, including termination resistors and coupling capacitors, are fabricated on a same chip, in an embodiment. Integrating the optical driver devices 110 and digital components of the optical transmitter on the same chip is particularly advantageous in communication systems that utilize multiple parallel communication links, in various embodiments. It is noted, however, that although the communication system 100 is illustrated in FIG. 1 as including multiple communication links 102 with multiple optical driver devices 110 coupled to respective light emitting devices 104, the communication system 100 includes a single communication link 102 and a single optical driver device 110 coupled to a single light emitting device 104, in some embodiments. Further, it is notes that although the optical driver devices 110 are generally described herein in the context of VCSEL devices, the configurations and configurations and techniques used in the optical driver devices 110 are used for driving suitable light emitting devices other than VCSEL devices, in some embodiments.

Figure 2:
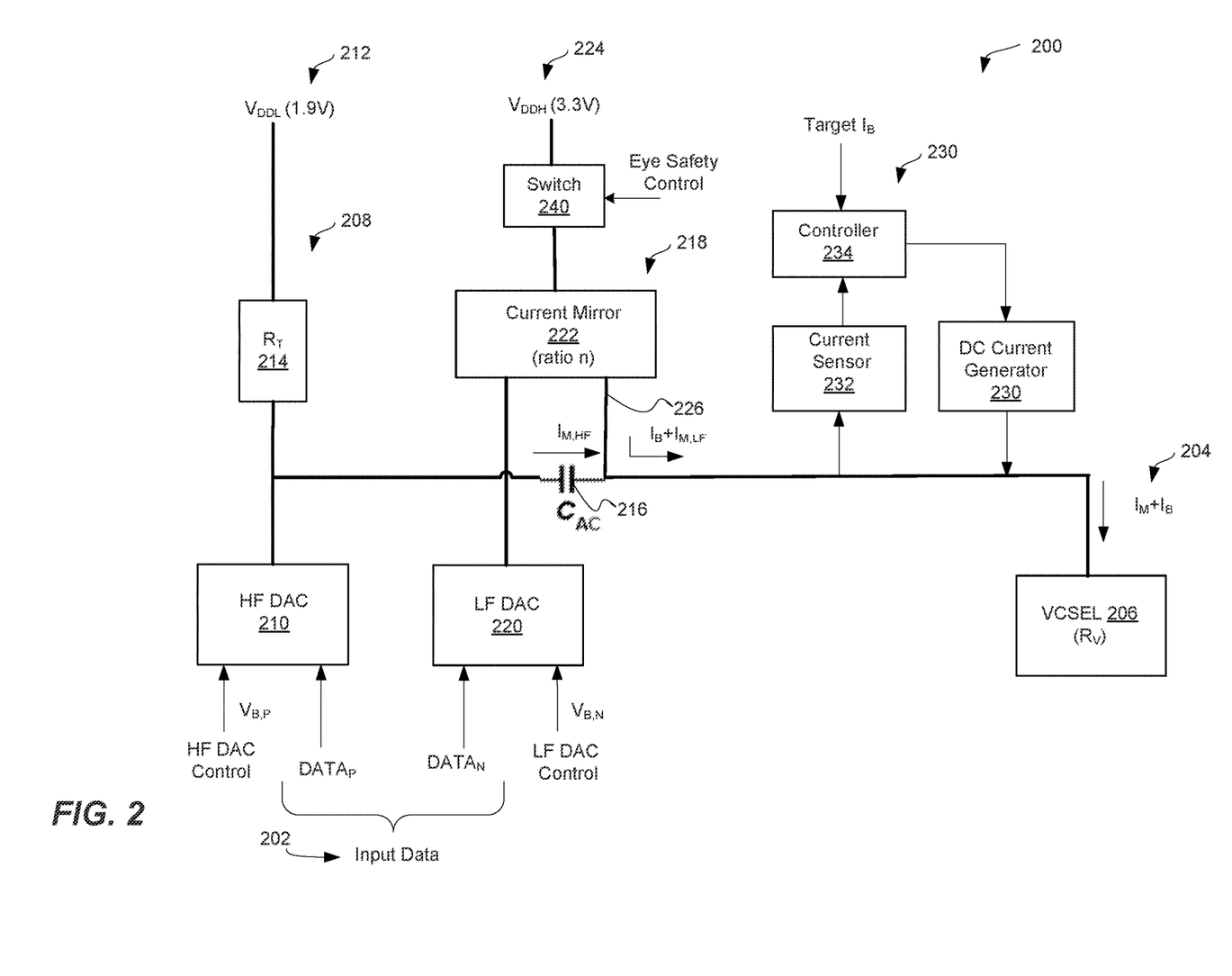
FIG. 2 is a block diagram of an example current-mode AC-coupled optical driver device utilized in an optical communication system such as the optical communication system of FIG. 1, according to an embodiment.

FIG. 2 is a block diagram of an example optical driver device 200, according to an embodiment. In an embodiment, the optical driver device 200 corresponds to each of the optical driver devices 110 of FIG. 1, and the optical driver device 200 is described with reference to FIG. 1 for ease of explanation. In other embodiments, the optical driver device 200 is utilized with communication systems different from the communication system 100 of FIG. 1. Similarly, the optical driver devices 110 of the communication system 100 of FIG. 1 are different from the optical driver device 200, in some embodiments.

The optical driver device 200 is configured to receive input data 202 in the form of digital signals representing modulation symbols to be transmitted over an optical communication channel, and to generate, based on the input data 202, an output current 204, comprising modulating current $I_M$ and bias current $I_B$, for driving a VCSEL device 206. The VCSEL device 206 is configured to convert the modulating current into a light signal for transmission over the communication channel. In an embodiment, the modulation symbols to be transmitted over the optical communication channel are PAM 4 symbols. In other embodiments, other suitable modulation schemes are utilized.

The optical driver device 200 includes a high-frequency current driver 208. The high-frequency current driver 208 is a current-mode driver that utilizes a current source to generate a high-frequency current portion $I_{M,HF}$ of the modulating current $I_M$, in an embodiment. In an embodiment, the high-frequency current driver 208 includes a current source switching circuit 210 powered by a first voltage source $V_{DDL}$ 212 via a termination resistor $R_T$ 214. In an embodiment, the current source switching circuit 210 is implemented as a DAC configured to generate a high-frequency portion of the modulating current $I_M$, and the switching circuit 212 is sometimes referred to herein as a high-frequency (HF) DAC 210. The high-frequency portion of the modulating current $I_M$ generated by the HF DAC 210 is coupled to the VCSEL device 206 via a coupling capacitor $C_{AC}$ 216, in an embodiment. The high-frequency portion of the modulating current contains frequency components of the modulating current that pass through the coupling capacitor $C_{AC}$ 216 without being blocked by the coupling capacitor $C_{AC}$ 216, in an embodiment. The optical driver device 200 also includes a low-frequency current driver 218. The low-frequency current driver 218 is a current-mode driver that utilizes a current source to generate a low-frequency current portion $I_{M,LF}$ of the modulating current $I_M$, in an embodiment. The low-frequency current driver 218 includes a current source circuit 220 and a current mirror circuit 222 powered from a second voltage source $V_{DDH}$ 224. In an embodiment, the current source circuit 220 is implemented as a DAC configured to generate the low-frequency current portion $I_{M,LF}$ of the modulating current $I_M$, and the switching circuit 220 is sometimes referred to herein as a low-frequency (LF) DAC 220. The low-frequency portion $I_{M,LF}$ generated by the LF DAC 220 is mirrored onto a path 226 that bypasses the coupling capacitor $C_{AC}$ 216, and is thus provided to the VCSEL 206 without passing though the coupling capacitor $C_{AC}$ 216, in an embodiment. The low-frequency portion of the modulating current contains frequency components of the modulating current that are blocked by the coupling capacitor $C_{AC}$ 216, in an embodiment.

In embodiments, a relatively high supply voltage (e.g., 3.3V or higher voltage) is required to properly bias the VCSEL device 206. In an embodiment, the voltage source $V_{DDH}$ 224 provides a voltage level that is sufficiently high for biasing the VCSEL device 206 for proper operation of the VCSEL device 206. The coupling capacitor $C_{AC}$ 216 separates the components powered by the voltage source $V_{DDH}$ 224 from the components powered by the voltage source $V_{DDH}$ 224, allowing the respective components to operate in different source voltage environments, in an embodiment. In an embodiment, the voltage level of the voltage source $V_{DDH}$ 224 is higher as compared to the voltage level of the voltage source $V_{DDL}$ 212. As a non-limiting example, the voltage level of the voltage source $V_{DDH}$ 224 is 3.3V or higher whereas the voltage level of the voltage source $V_{DDL}$ 212 is 1.9V or lower. Powering the components of the high-frequency current driver 208 at a lower voltage allows the optical driver device 200 to be better integrated with digital components, such as data serializer components, that require lower supply voltage, in at least some embodiments. Further, operating the components of the high-frequency current driver 208 with a lower voltage reduces overall power consumed by the optical driver device 200, in at least some embodiments.

In operation, as illustrated in FIG. 2, input data, denoted in FIG. 2 as $DATA_P$, is provided to the HF DAC 210. Concurrently, inverse of the input data, denoted in FIG. 2 as $DATA_N$, is provided to the LF DAC 220. The HF DAC 210 includes a plurality of current slices, each current slice configured to output a predetermined amount of current, in an embodiment. Based on the value of the $DATA_P$ input, the HF DAC 210 switches a number of current slices to pull a corresponding amount of modulating current away from the VCSEL device 206, generating modulating current that flows to the VCSEL device 206 via the coupling capacitor $C_{AC}$ 216, in an embodiment. As the modulating current generated by the HF DAC 210 based on the $DATA_P$ passes through the coupling capacitor $C_{AC}$ 216 to the VCSEL device 206, the relatively low frequency components of the modulating current are blocked by the coupling capacitor $C_{AC}$ 216. Thus, the high-frequency modulating current $I_{M,LF}$ at the output of the coupling capacitor $C_{AC}$ 216 does not include the relatively lower frequency components of the modulating current that are blocked by the coupling capacitor $C_{AC}$ 216.

With continued reference to FIG. 2, the LF DAC 220 includes a plurality of current slices, each current slice configured to output a predetermined amount of current, in an embodiment Based on the value of the $DATA_N$ input, the LF DAC 220 switches a number of current slices to pull a corresponding amount of current away from the VCSEL device 206, generating the low-frequency current signal $I_{M,LF}$. The current signal generated based on the $DATA_N$ is mirrored onto the path 226 by the current mirror circuit 222, generating the low-frequency current signal $I_{M,LF}$ that contains frequency components of the modulating current $I_M$ that are blocked by the coupling capacitor $C_{AC}$ 216, in an embodiment. The low-frequency current signal $I_{M,LF}$ is thus combined with the high-frequency current signal $I_{M,HF}$ to generate the modulating current $I_M$ for modulating the VCSEL device 206.

In an embodiment, the predetermined amount of current generated by each slice of the HF DAC 210 is scaled relative to the predetermined amount of current generated by each slice of the LF DAC 220 by a factor of m. As just an example, the predetermined amount of current generated by each slice of the HF DAC 210 is 400 mA and the predetermined amount of current generated by each slice of the LF DAC 220 is 100 mA (i.e., scaling factor of 4), in an embodiment. Other values of the scaling factor m are utilized in other embodiments. As will be explained in more detail below, the value of the scaling factor m is selected to equalize the gain of the high-frequency current driver 208 and the high frequency current driver 218, in an embodiment.

Generally, provided that that the frequency of $I_{M,LF}$ is sufficiently higher than a pole created by $C_{AC}$ 216, the termination resistance $R_T$ 214 and the equivalent resistance, $R_V$, of the VCSEL device 206 (i.e. $1/(R_T+R_V) C_{AC}$), the lower-cutoff frequency of $I_{M,HF}$ and higher cut-off frequency of $I_{M,LF}$ self-aligns to yield a generally flat frequency response of the modulation current $I_M$. In an embodiment, in order to ensure that the modulating current $I_M$ flowing through the VCSEL device 206 has a flat amplitude response over frequency, the high-frequency current driver 208 and the low-frequency current driver 218 are configured to provide equal gain for the high-frequency modulating current $I_{M,HF}$ and the low-frequency modulating current $I_{M,LF}$. In an embodiment, to provide equal gain for the high-frequency modulating current $I_{M,HF}$ and the low-frequency modulating current $I_{M,LF}$, the high-frequency current driver 208 and the low-frequency current driver 218 are designed such that Equation 1 is satisfied:

$$\frac{n}{m} = \frac{R_T}{R_T + R_V} \quad \text{Equation 1}$$

where n is a mirror ratio of the current mirror circuit 212, m is a ratio between current output by each slice of the HF DAC 210 and current output by each slice of the LF DAC 216, $R_T$ is the calibrated termination resistance, and $R_V$ is the equivalent resistance of the VCSEL device 206. In embodiments, the absolute values of m and n determine power dissipation in the low-frequency current driver 210, with higher values resulting in lower power dissipation at the expense of mirroring error in the current mirror circuit 212. In an embodiment, flatness of the frequency response of the modulating current $I_M$ is further adjustable via control of respective bias voltages, or bias currents, provided to the HF DAC 210 and the LF DAC 220 to adjust the gain provided for the high-frequency modulating current $I_{M,HF}$ and/or the low-frequency modulating current $I_{M,LF}$. In an embodiment, the slices of the HF DAC 210 and/or the LF DAC 220 are designed to pre-distort the rise-fall times of pulses of the modulation current $I_M$ to counter rise-fall time imbalance that is inherent to the VCSEL device 206, in an embodiment.

Figure 3:
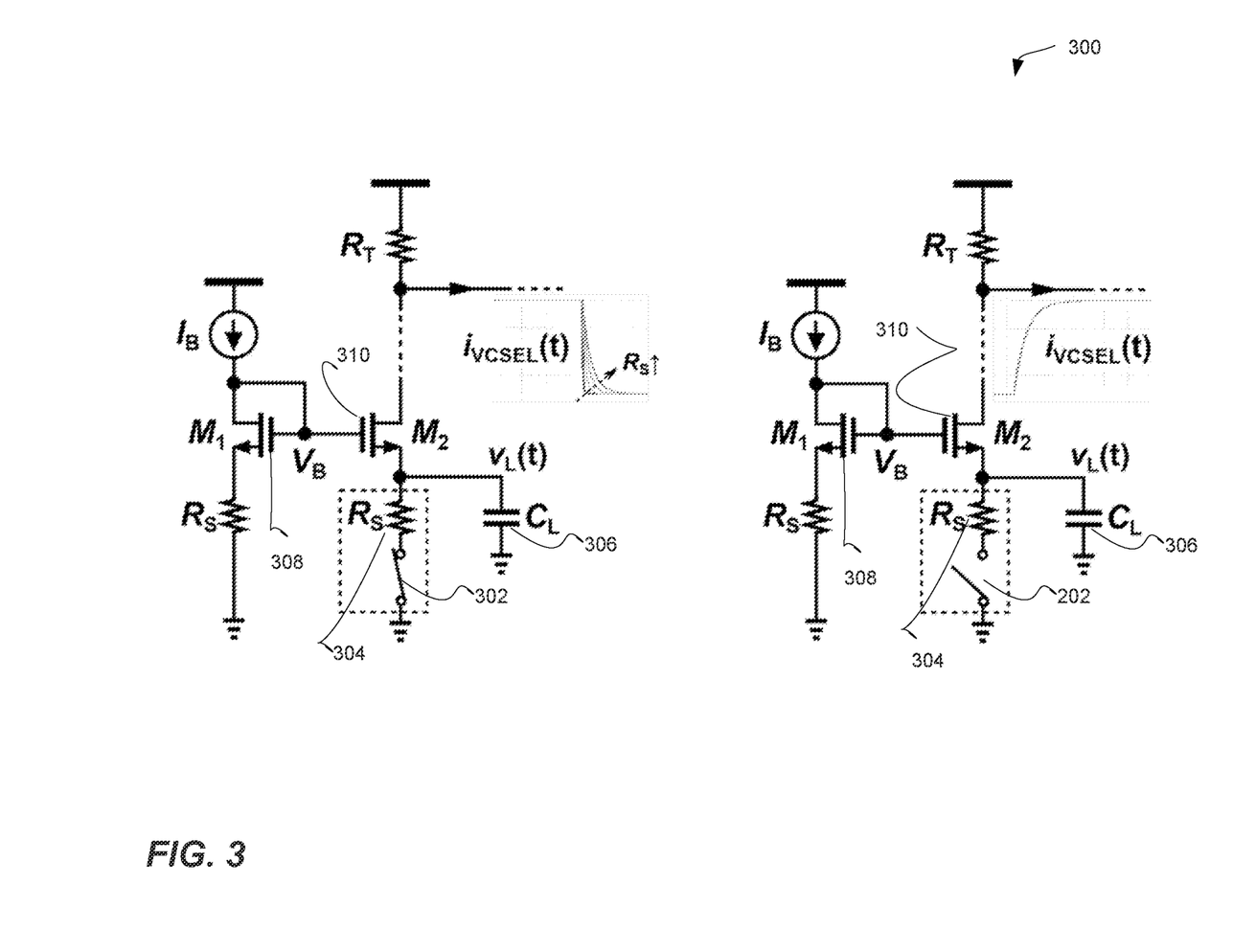
FIG. 3 is a diagram depicting a model of a switching circuit utilized with the current-mode AC-coupled optical driver device of FIG. 2, according to an embodiment.

In an embodiment, the slices of the HF DAC 210 and/or the LF DAC 220 are designed to pre-distort the rise-fall times of pulses of the modulation current $I_M$ to counter rise-fall time imbalance that is inherent to the VCSEL device 206, in an embodiment. Referring briefly to FIG. 3, a simplified model of a current slice 300 that corresponds to current slices of the HF DAC 210 and the LF DAC 220 of FIG. 2 is shown in, respectively, switched in and switched out configurations, according to an embodiment. In particular, a switch 302 in series with a resistor $R_S$ 304 models a slice of the DAC and the capacitor $C_L$ 306 models parasitics that arise from materials on construction of the DAC. The voltage across the capacitor $C_L$ 206, $v_L(t)$, determines the speed at which the current output by the DAC rises or falls at each data transition. For example, when the DAC switch is closed, $v_L(t)$ transitions from approximately a value of $(V_B-V_{TH})$ to $I_B R_S$, where $V_{TH}$ is the threshold voltage of transistors $M_1$ 308 and $M_2$ 310, and $I_B$ is the bias current of the DAC. This action turns on $M_2$ 310, allowing it to steal current from the VCSEL device 206 and creating a falling edge. Generally, the smaller the resistance $R_S$ 304, the higher the pole $(1/R_S C_L)$ at $v_L$ and the faster the falling edge of the output current signal. In an embodiment, quantitatively, the 90% to 10% fall-time can be calculated as:

$$t_{fall} = \frac{g_m R_s}{1 + g_m R_s}\left[\ln 10 + \frac{g_m R_s}{2 + g_m R_s}\right] \quad \text{Equation 2}$$

where $g_m$ is the small-signal transconductance of $M_2$ derived from square-law transistor equation. The fall time can be simplified for two extreme cases, i.e. for small and large values of $R_S$ 304 such that $g_m R_S \ll 1$ and $g_m R_S \gg 1$, respectively. For small values of $R_S$, Equation 2 reduces to $2.3R_S C_L$, while for large values of $R_S$, Equation 2 can be approximated as $$\frac{3.3 C_L}{g_m},$$

indicating that the fall time can be controlled by tuning $R_S$ up to a certain value. On the other hand, the opposite happens when the DAC switch is opened: $v_L(t)$ is charged back-up from $I_B R_S$ to roughly $(V_B - V_{TH})$, reducing the current through $M_2$ and creating a rising edge in the VCSEL current. Generally, the 10% to 90% rise time can be approximated as $$t_{rise} \approx \frac{17.6 C_L}{g_m},$$

indicating an inherently larger rise time with no dependency on $R_S$ 304.

Referring now to FIGS. 2 and 3, in an embodiment, slices, such as the slice 300, of the HF DAC 210 and/or the LF DAC 220, are designed with vales $R_S$ and capacitance $C_L$ that cause a desired rise-fall time mismatch to counter the inherent rise-fall time mismatch of the VCSEL device 206. Since this larger rise time and shorter fall time is opposite to VCSEL optical behavior, the rise-fall mismatch is inherently corrected by applying the DAC to modulate $i_{VCSEL}(t)$. Correcting the mismatch, in turn, reduces or eliminates an eye tilt in the optical output that would have been caused by the VCSEL device 206 without pre-distorting provided by the DAC, in at least some embodiments.

With continued reference to FIG. 2, as discussed above, in addition to generating the modulation $I_M$ for modulating a light signal output by the VCSEL 206, the optical driver device 200 also generates a direct current (DC) bias current $I_B$ for biasing the VCSEL device 206. In an embodiment, the high-frequency modulating current $I_{M,LF}$ generated by the high-frequency current driver 208 is passed through the coupling capacitor $C_{AC}$ 216, no DC current is provided to the VCSEL device 206 from the high-frequency current driver 208. On the other hand, the low-frequency current driver 218 outputs current via the path 226 that does not pass through the coupling capacitor $C_{AC}$ 216 and thus the current generated by the low-frequency current driver 218 includes DC current provided to the VCSEL device 206. In an embodiment, the optical driver device 200 includes an additional bias current source 230. The optical driver device 200 also includes a current sensor 232 and a controller device 234 configured to control amount of current generated by the additional bias current source 230, in an embodiment.

In an embodiment, the current sensor 232 is configured to dynamically sense the amount of bias current provided to the VCSEL device 206 over time during operation of the optical driver device 200. The controller device 234 is configured to determine an adjustment that needs to be provided to the current $I_B$ sensed by the current sensor 232 so that the current flowing through the VCSEL device 206 is at least substantially equal to a target $I_B$ current value 238 for the VCSEL device 206. The controller device 234 is configured to control the DC current generator 236 to generate a corresponding amount of DC current to provide the determined adjustment to the current $I_B$. The controller device 234 thus dynamically controls the amount of $I_B$ current flowing through the VCSEL device 206 to ensure that the target $I_B$ current is constantly provided to the VCSEL device 206, in an embodiment.

Referring still to FIG. 2, in some embodiments, the optical driver device 200 additionally includes a switch 240 configured to cut-off the voltage source $V_{DDH}$ 212 from the VCSEL device 206 in some situations. For example, an eye safety control signal 242 is utilized to cut off the voltage source $V_{DDH}$ 212 from the VCSEL device 206 to turn off the VCSEL device 206 in situations in which the VCSEL device 206 produces high amount of optical intensity in wavelengths that can be harmful for human eye, and to avoid a single-point failure (SPF) scenario. The optical driver device 200 omits the switch 240 in some embodiments in which the optical driver device 200 is configured for operation in a system in which eye safety protection and SPF scenario avoidance are not required.

Figure 4:
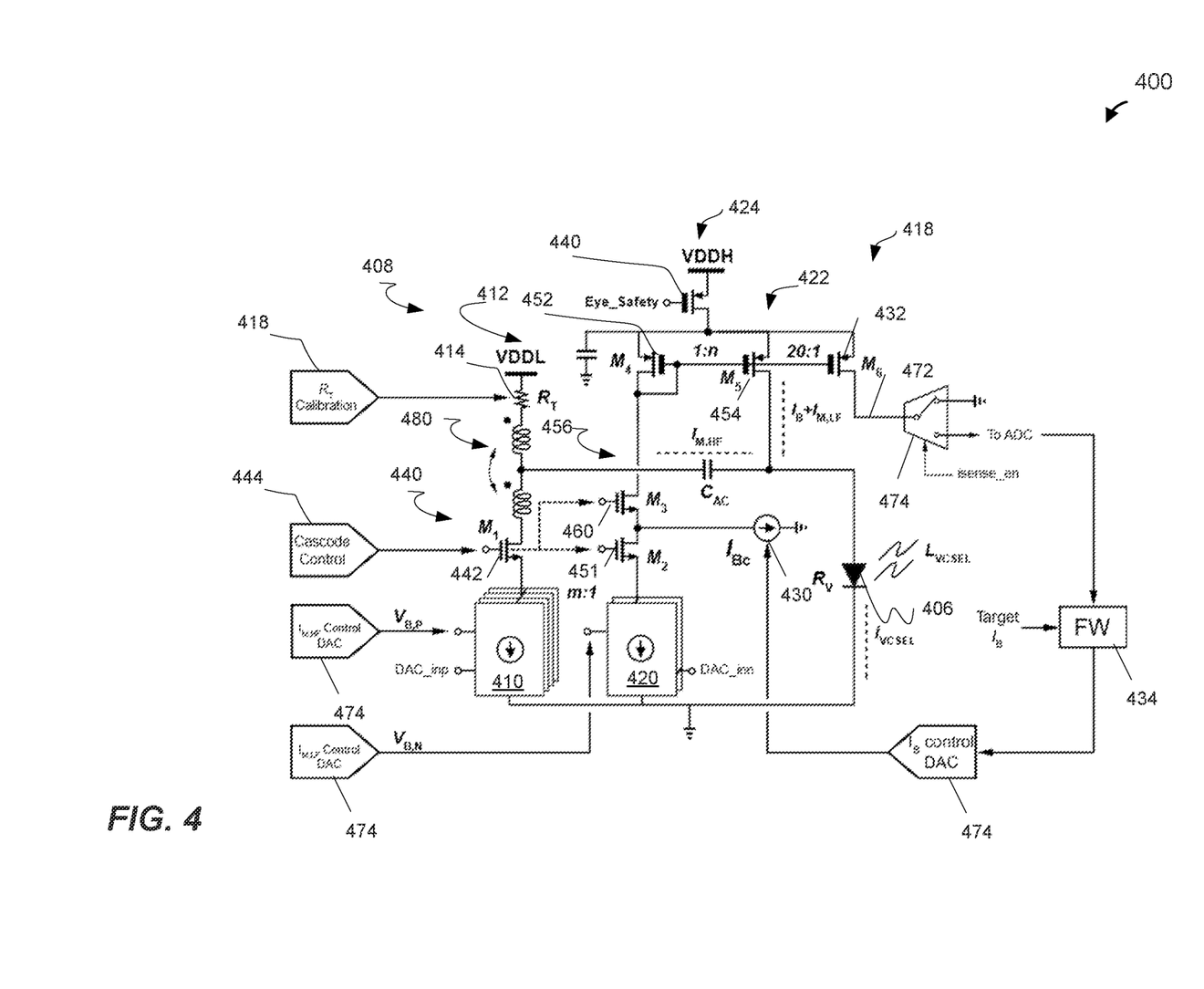
FIG. 4 is a circuit diagram depicting an example implementation of the current-mode AC-coupled optical driver device of FIG. 2, according to an embodiment.

Turning now to FIG. 4, an optical driver device 400 that corresponds to an example circuit implementation of the optical driver device 200 of FIG. 2, according to an embodiment. The optical driver device 400 includes like-numbered components to the optical device 200 of FIG. 2 which are not described again in detail for the purpose of conciseness. In other embodiments, the optical driver device 200 of FIG. 2 is implemented in manners different from the optical driver device 300.

The optical driver device 400 is configured to drive a light emitting device 406 corresponding to the VCSEL device 206 of FIG. 2. The optical driver device 400 includes a high-frequency current driver 408, which in turn includes including an HF DAC 410. The optical driver device 400 also includes a low-frequency current driver 418, which in turn includes an LF DAC 420 and a current mirror circuit 422, in an embodiment. The high-frequency current driver 408 is powered from a voltage source $V_{DDL}$ 412 via a termination resistor 414, in an embodiment. The low-frequency current driver 308 is powered from a voltage source $V_{DDH}$ 424 relatively higher than the voltage source $V_{DDL}$ 412, in an embodiment.

In an embodiment, the termination resistor 414 is adjustable. For example, a calibration signal 418 is provided to digitally adjust the resistance of the termination resistor 414 to tune the overall termination resistance of the optical driver device 400, in an embodiment. In an embodiment, the high-frequency current driver 408 includes cascode device 440 comprising a transistor $M_1$ 442. The cascode device 440 is configured to reduce electrical overstress of the HF DAC 410, in an embodiment. In some embodiments, the bias of the transistor $M_1$ 442 is controlled by a cascode control signal 444 to adjust the biasing of the cascode device 440. The biasing of the transistor $M_1$ 442 is adjustable to improve gain linearity in high-frequency current driver 408, in some embodiments. In some embodiments, the cascode device 440 is omitted. For example, a relatively lower voltage level of the voltage source $V_{DDL}$ 412 is utilized to reduce power consumption of the optical driver device 400, where the relatively lower voltage level does not cause electric over-stress of the HF DAC 410 and does not provide sufficient voltage overhead for operation of the cascode device 440, in some embodiments.

Referring now to the low-frequency current driver 418, the current mirror circuit 422 is implemented using a pair of P-MOS transistors $M_4$ 452 and $M_5$ 454 with connected gates, in the illustrated embodiment. In other embodiments, the current mirror circuit 422 is implemented in other suitable manners. In an embodiment, the low-frequency current driver 422 also includes a cascode device 456 comprising a pair of transistors $M_2$ 458 and $M_3$ 460. The cascode device 456 is configured to reduce electrical over-stress of the LF DAC 420, in an embodiment. In some embodiments, the bias of each of the transistors $M_2$ 458 and $M_3$ 460 is controlled by the cascode controller 444 to adjust the gain of the cascode device 456. The gain of the cascode device 456 is thus adjustable to improve gain linearity in low-frequency current driver 418, in some embodiments. In some embodiments, the cascode device 456 is omitted. For example, a relatively lower voltage level of the voltage source $V_{DDH}$ 424 is required to properly bias the VCSEL device 406, where the lower voltage level of the voltage source $V_{DDH}$ 424 does not cause electrical overstress in the LF DAC 420, in some embodiments.

With continued reference to FIG. 4, the optical driver device 400 further includes a current sensor 432, a controller 434, and a DC current generator 430, in an embodiment. The DC current generator 430 is advantageously connected in low impedance mode of the source of the transistor $M_3$ 460 such that the DC current generator 430 is operated using advantageous voltage level (e.g., within an advantageous voltage level range) and without slowing down operation of the low-frequency current driver 418, in an embodiment. In another embodiment, however, the DC current generator 430 is placed at a suitable location different from the source of the transistor $M_3$ 460. The current sensor device 432 is a transistor M6 configured to mirror current provided to the VCSEL device 406 to a sensing path 472, in an embodiment. In some embodiments, the optical driver device 400 also includes a switch 474 controllable by a sense enable control signal 476 to enable or disable bias current adjustment operation in the optical driver device 300. When bias current adjustment operation is enabled, the current mirrored onto the sensing path 472 is converted to a digital signal by an analog to digital converter (not shown) and the digital signal is provided to the controller 434. The controller 434 determines an adjustment needed for the bias current based on the digitized current sensor output and a target bias current $I_B$, and generates a digital control signal to control the DC current source 430. The digital control signal is converted to an analog signal by a DAC 474, and the analog signal is provided to the current source 430, in an embodiment. The controller 434 thus dynamically controls the amount of $I_B$ current flowing through the VCSEL device 406 to ensure that the target $I_B$ current is constantly provided to the VCSEL device 406, in an embodiment.

Referring still to FIG. 4, in an embodiment, the optical driver device 400 includes an eye safety switch 440, in an embodiment. The eye safety switch 440 comprises a transistor, in the illustrated embodiment. In other embodiments, the eye safety switch 440 is implemented in other suitable manners. In some embodiments, the optical driver device 400 omits the eye safety switch 440. In an embodiment, due to a relatively high voltage level (e.g., 3.3V) of the voltage source $V_{DDH}$ 424 needed to power the VCSEL device 406, thick-oxide devices with optimized sizes are utilized to implement one or more components connected to $V_{DDH}$ 424, such as the transistor of the eye safety switch 340 and the M4 452, M5 454 and M6 432, to avoid electrical over-stress of these components connected to $V_{DDH}$ 424. Further, an inductive structure 480 comprising, for example, one or more T-coil inductive peaking structures, is placed in series with the termination resistor 414 to compensate for parasitic capacitance that is caused by the thick-oxide devices and to support high-speed transmission of data, in some embodiments. Moreover, in some embodiments, thin-oxide devices, such as thin-oxide MOSFET transistors, are utilized to implement the cascode device 456 of the low-frequency current driver 418 to avoid slow-down of the low-frequency current driver 418.

Figure 5:
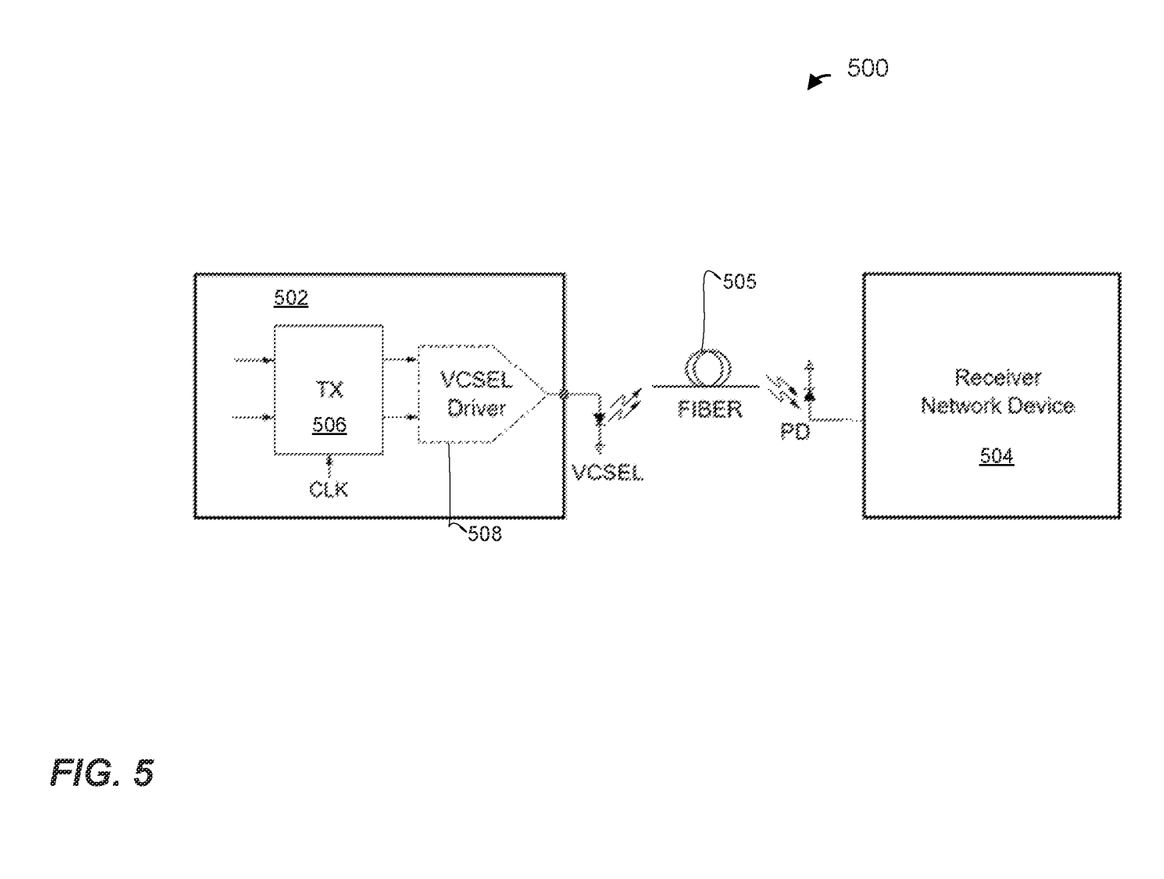
FIG. 5 is a block diagram of an example communication system the current-mode AC-coupled optical driver device of FIG. 2, according to an embodiment.

FIG. 5 is a block diagram of an example communication system 500, according to an embodiment. The communication system includes an optical transmitter device 502 coupled to an optical receiver deice 504 via a fiber xxlink 505, in an embodiment. The optical transmitter device 502 includes transmitter digital components 506 and an optical driver device 508 fabricated on a same chip, in an embodiment. The optical driver device 508 corresponds to the optical driver device 200 of FIG. 2, in an embodiment. The optical driver device 508 is different from the driver device 200 of FIG. 2, in another embodiment. The optical driver device 508 is a current-mode driver fabricated using CMOS technology, in an embodiment. In another embodiment, the optical driver device 508 is fabricated using suitable technology other than CMOS technology.

Integration of the optical driver device 508 on the same chip with the transmitter digital components 506 is enabled, at least in part, by CMOS fabrication of the optical driver device 508, in an embodiment. Further, integration of the termination resistor and the coupling capacitor on a same chip as the optical driver device 508 and the transmitter digital components 506 is enabled by to the relatively small size of the termination resister and the coupling capacitor is, in turn, enabled by the separate high frequency and low frequency current generators and current-mode configuration topology of the optical driver device 508, in an embodiment. In an embodiment, due to current-mode configuration of the optical driver device 508, the termination resistance of the optical driver device 508 is more easily controlled as compared to drivers that utilize voltage-mode configurations, in at least some embodiments. In an embodiment, gain linearity and/or rise-fall time pre-distortion are provided in the integrated optical driver device 502 in accordance with the techniques of the present disclosure. Thus, by offering reduction in the size of the termination resistor and the coupling capacitor of the optical driver device 508 while controlling termination resistance and amplitude linearity the modulating current generated by the optical driver device 508 and rise-fall time pre-distortion in the modulating current generated by the optical driver device 508, the techniques of the present disclosure allow integration of the optical driver device 508 on a same chip with digital transmitter electronics, reducing the cost of the optical transmitter 500, without sacrificing performance of the optical transmitter 500, in at least some embodiments.

Figure 6:
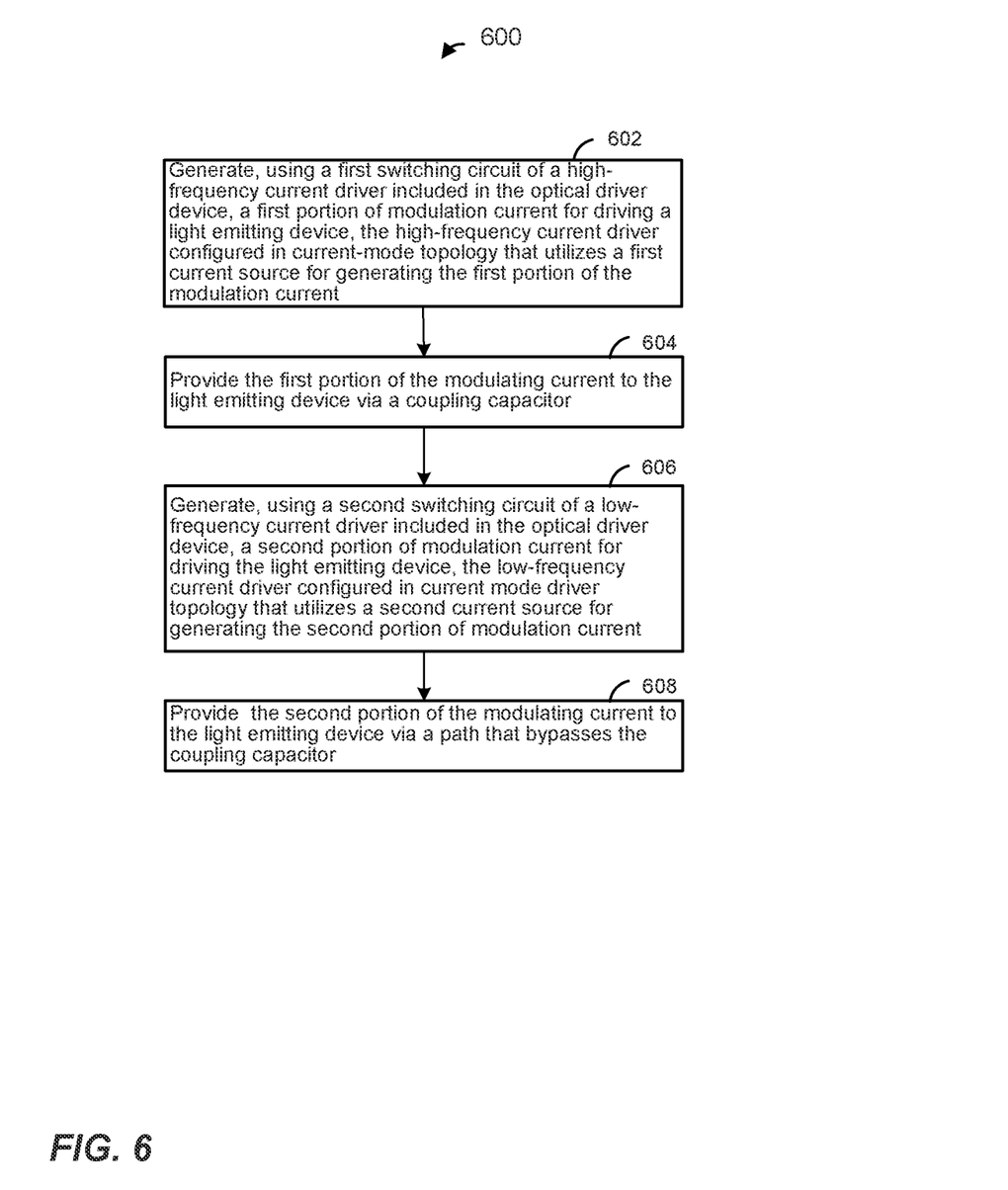
FIG. 6 is a flow diagram illustrating an example method for driving a light emitting device using an optical driver device, according to an embodiment.

FIG. 6 is a flow diagram illustrating an example method 600 for driving an optical device, according to an embodiment. In an embodiment, the optical driver devices 108 of FIG. 1 implements the method 600. In an embodiment, the optical driver device 200 of FIG. 2 implement the method 600. For ease of explanation, the method 600 is described with reference to the communication system 100 of FIG. 1 and the optical driver device 200 of FIG. 2. In other embodiments, the method 600 is implemented in suitable systems different from the communication system 100 of FIG. 1 and/or by suitable optical driver devices different from the optical driver device 200 of FIG. 2.

At block 602, a first portion of modulation current for driving the light emitting device is generated. The first portion of the modulating current is generated at block 602 using a using a first switching circuit of a high-frequency current driver included in the optical driver device. The high-frequency current driver is configured in current-mode topology for generating the first portion of the modulation current, in an embodiment. For example, the high frequency modulating current $I_{M,HF}$ is generated by the HF DAC 210 of the high-frequency current driver 208 of FIG. 2. In another embodiment, the first portion of modulating current is generated at block 602 using a suitable current switching circuit different from the HF DAC 210 and/or using a high-frequency current driver different from the high-frequency current driver 208 of FIG. 2.

At block 604, the first portion of the modulating current is provided to the light emitting device via a coupling capacitor. For example, the first portion of the modulating current is provided to the light emitting device via the coupling capacitor $C_{AC}$ 216 of FIG. 2. In an embodiment, the coupling capacitor is integrated on a same chip as the high-frequency current driver included in the optical driver device. In another embodiment, the coupling capacitor is provided externally to the optical driver device.

At block 606, a second portion of modulating current for driving the light emitting device is generated. The second portion is generated using a second switching circuit of a low-frequency current driver included in the optical driver device. In an embodiment, the low-frequency current driver is configured in current mode driver topology for generating the second portion of modulation current. For example, the low frequency modulating current $I_{M,LF}$ is generated by the LF DAC 220 of the low-frequency current driver 218 of FIG. 2. In another embodiment, the second portion of modulating current is generated at block 602 using a suitable current switching circuit different from the LF DAC 220 and/or using a low-frequency current driver different from the low-frequency current driver 218 of FIG. 2.

At block 608, the second portion of the modulating current is provided to the light emitting device via a path that bypasses the coupling capacitor. For example, second portion of modulating current is mirrored by the mirror circuit 222 onto the path 226 that bypasses the coupling capacitor $C_{AC}$ 216 in FIG. 2. In another embodiment, the second portion of modulating current is provided to the light emitting device via a path that bypasses the coupling capacitor in other suitable manners.

Because the optical driver device is configured in current mode driver topology for generating modulation current, termination resistance of the optical driver device is accurately controlled, for example by tuning of a termination resistor provided in the optical driver device, in an embodiment. In some embodiments, the first switching circuit and the second switching circuit are designed and/or controlled such that portion of modulating current and the second portion of modulating current combine to produce a modulating current that is flat over frequency, in an embodiment. For example, gain of the first switching circuit and/or the second switching circuit is independently controlled to equalize the gain of the high-frequency current driver and the low-frequency current driver, in an embodiment. In some embodiments, the first switching circuit and/or the second switching circuit are designed to pre-compensate for rise-fall time imbalance inherent to the light emitting device at least by introducing, into one or both of the high-frequency portion of the modulating current or the low-frequency portion of the modulating current, a rise-fall time asymmetry in an opposite direction from the rise-fall time asymmetry of the light emitting device. These and other techniques described herein allow for integration of the optical driver device on a same chip with a termination resister and the coupling capacitor, reducing the cost of the optical driver device and enabling reduction of power dissipation in the optical driver device, without sacrificing performance of the light emitting device, in at least some embodiments.

At least some of the various blocks, operations, and techniques described above are suitably implemented utilizing dedicated hardware, such as one or more of discrete components, an integrated circuit, an application-specific integrated circuit (ASIC), a programmable logic device (PLD), a processor executing firmware instructions, a processor executing software instructions, or any combination thereof. When implemented utilizing a processor executing software or firmware instructions, the software or firmware instructions may be stored in any suitable computer readable memory such as on a magnetic disk, an optical disk, or other storage medium, etc. The software or firmware instructions may include machine readable instructions that, when executed by one or more processors, cause the one or more processors to perform various acts.

While the present invention has been described with reference to specific examples, which are intended to be illustrative only and not to be limiting of the invention, changes, additions and/or deletions may be made to the disclosed embodiments without departing from the scope of the invention.

What is claimed is:

1. An optical driver device for driving a light emitting device, the optical driver device comprising:
   a coupling capacitor for coupling an output of the optical driver device to the light emitting device, the coupling capacitor having a first node configured to couple to the light emitting device;
   a high-frequency current-mode driver having a first output coupled to a second node of the coupling capacitor-frequency current-mode driver including a first switching circuit configured to generate a first current, the high-frequency current-mode driver configured to utilize a first current source for generating the first current; and
   a low-frequency current-mode driver having a second output coupled to the first node of the coupling capacitor, the low-frequency current-mode driver including a second switching circuit configured to generate a second current, the coupling of the second output to the first node of the coupling capacitor providing a path for the second current to the light emitting device that bypasses the coupling capacitor, the low-frequency current-mode driver configured to utilize a second current source for generating the second current.

2. The optical driver device of claim 1, wherein:
   the first switching circuit comprises a first digital to analog converter having a first plurality of current slices, and
   the second switching circuit comprises a second digital to analog converter having a second plurality of current slices, each current slice in the second plurality of current slices outputting a smaller amount of current by a scaling factor of m relative to each current slice in the first plurality of current slices.

3. The optical driver device of claim 2, wherein the low-frequency current-mode driver further includes a current mirror circuit configured to mirror current output by the second switching circuit to the second output of the low frequency current-mode driver, whereon the mirror circuit has a mirroring ratio of n.

4. The optical driver device of claim 3, wherein a value of the scaling factor m and a value of the mirroring ratio n are selected to equalize levels of current output by the high-frequency current-mode driver and the low-frequency current-mode driver.

5. The optical driver device of claim 2, wherein:
the first digital to analog converter is configured to use a first adjustable bias current, and
the second digital to analog converter is configured to use a second adjustable bias current, the second adjustable bias current being adjustable independently of the first adjustable bias current.

6. The optical driver device of claim 1, further comprising a bias current generator configured to generate a direct current (DC) for adjusting a bias current flowing through the light emitting device.

7. The optical driver device of claim 6, further comprising:
a sensing circuit configured to measure an average DC current at the output of the optical driver device,
a digital controller configured to generate a control signal based on the average DC current provided to the light emitting device and a target bias current for the light emitting device, and
a digital to analog converter configured to convert the digital control signal to an analog control signal for adjusting the amount of DC current generated by the bias current generator.

8. The optical driver device of claim 1, wherein:
the first switching circuit is configured to be powered from a first voltage source, and
the second switching circuit is configured to be powered from a second voltage source, wherein a voltage level of the second voltage source is higher than a voltage level of the first voltage source.

9. The optical driver device of claim 1, wherein the coupling capacitor is integrated on a same chip as the high-frequency current-mode driver and the low-frequency current-mode driver.

10. The optical driver device of claim 1, wherein one or both of the first switching circuit or the second switching circuit is configured to pre-compensate for a rise-fall time asymmetry of the light emitting device at least by introducing, into one or both of the first portion or the second portion of the modulating current, a rise-fall time asymmetry in an opposite direction from the rise-fall time asymmetry of the light emitting device.

11. The optical driver device of claim 1, wherein the light emitting device is a vertical cavity surface emitting laser (VCSEL).

12. A method for driving a light emitting device using an optical driver device, the method comprising:
generating, using a first switching circuit of a high-frequency current-mode driver included in the optical driver device, a first current, the high-frequency current-mode driver configured to utilize a first current source for generating the first current;
providing the first current to the light emitting device via a coupling capacitor;
generating, using a second switching circuit of a low-frequency current-mode driver included in the optical driver device, a second current, the low-frequency current-mode driver configured to utilize a second current source for generating the second current; and
providing the second current to the light emitting device via a path that bypasses the coupling capacitor.

13. The method of claim 12, wherein:
generating the first current using the first switching circuit comprises generating the first current using a first digital to analog converter having a first plurality of current slices, and
generating the second current using the second switching circuit comprises generating the second current using a second digital to analog converter having a second plurality of current slices, each current slice in the second plurality of current slices outputting a smaller amount of current by a factor of m relative to each current slice in the first plurality of current slices.

14. The method of claim 13, further comprising mirroring, using a current mirror circuit, current output by the second digital to analog converter to the path that bypasses the coupling capacitor, wherein current mirror has a mirroring ratio of n.

15. The method of claim 14, further comprising equalizing levels of current output by the high-frequency current mode driver and the low-frequency current-mode driver by controlling a value of the factor m and a value of the mirroring ratio n.

16. The method of claim 13, further comprising independently adjusting one or both of i) a bias current of the first digital to analog converter and ii) a bias current of the second digital to analog converter to independently control a gain of one or both of i) the high-frequency current-mode driver and ii) the low-frequency current-mode driver.

17. The method of claim 12, further comprising generating, using a bias current generator, a direct current (DC) for adjusting a bias current flowing through light emitting device.

18. The method of claim 17, further comprising:
sensing, using a sensing circuit, an average DC current provided to the light emitting device,
generating, based on the average DC current and a target bias current for the light emitting device, a control signal for adjusting an amount of DC current generated by the bias current generator, and
providing the control signal to the bias current generator to adjust the amount of DC current generated by the bias current generator.

19. The method of claim 12, further comprising
providing power to the first switching circuit from a first voltage source, and
providing power to the second switching circuit from a second voltage source, wherein a voltage of the second voltage source is higher than a voltage of the first voltage source.

20. The method of claim 12, further comprising pre-compensating, using one or both of the first switching circuit or the second switching circuit, for a rise-fall time asymmetry of the light emitting device by introducing, into one or both of the first current or the second current, a rise-fall time asymmetry in an opposite direction from the rise-fall time asymmetry of the light emitting device.

* * * * *